United States Patent Office 3,491,982
Patented Jan. 27, 1970

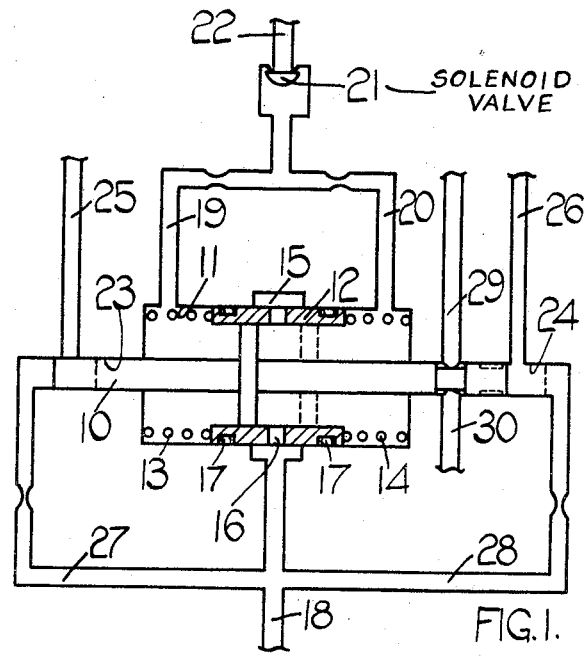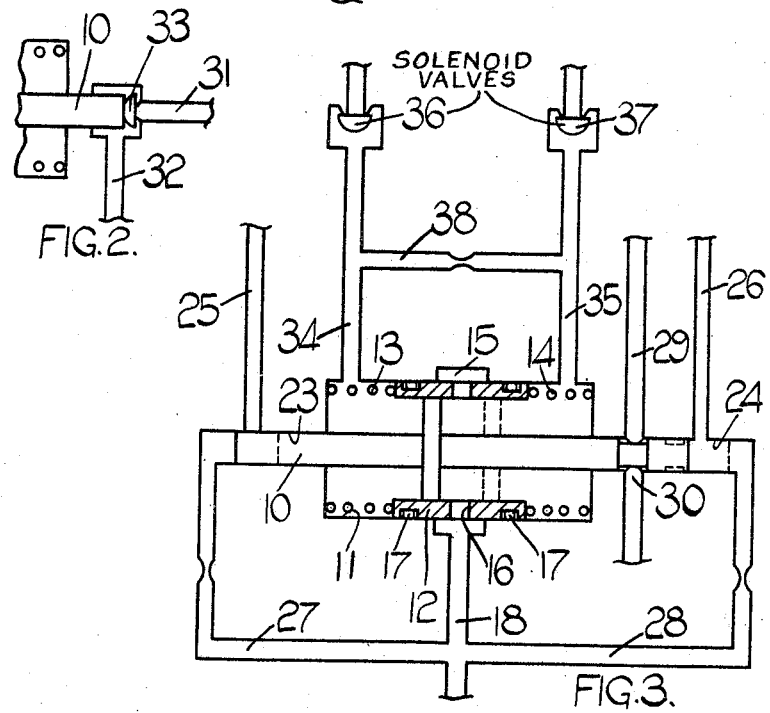

3,491,982
PISTON OPERATED VALVE WITH RELATIVELY MOVABLE SLEEVE
Denis Gascoigne, Alcester, England, assignor to Joseph Lucas (Industries) Limited, Birmingham, England, a British company
Filed Feb. 19, 1968, Ser. No. 706,342
Int. Cl. F16k 31/06, 31/143
U.S. Cl. 251—30                                    12 Claims

ABSTRACT OF THE DISCLOSURE

A valve comprising a body having a member disposed in it, the member being capable of occupying two positions, in one of which fluid flow through a passage 29, 30 is permitted and in the other of which such flow is prevented, the position of the member being maintained by application of pressure at its ends, and a sleeve between the body and the member whereby fluid can escape from one side of the member, the side from which it escapes being dependant upon the position of the member with respect to the sleeve and body, and means for initiating change of the member from one position to the other.

---

This invention relates to valves intended to control the flow of fluid and the object of the invention is to provide such a valve in a convenient form.

In accordance with the present invention a valve comprises a body, a member disposed within the body and capable of occupying either of two positions in each of which it is maintained when in use by the application of fluid pressure on said member, passage means in the body through which the direction of flow of fluid or the ability for flow to take place is dependent upon the position of the member in the body, a part of the member being disposed within a cylinder in the body, passages in the body communicating with opposite ends of the cylinder respectively, said passages communicating with one another through flow restricting means, a valve part disposed within the cylinder in the body, said valve part being movable between a first position in which the escape of fluid from one end of the cylinder is permitted and a second position in which such escape is prevented, the member and said valve part being movable, under the influence of a signal pulse applied through one of said passages to the cylinder, towards that end of the cylinder from which fluid can escape, the member moving to a position in which a change occurs in the direction of flow or the ability for flow to take place through said passage means and in which escape from the opposite end of the cylinder is permitted, the valve part only permitting such escape when the pressures at opposite ends of the cylinder equalise through the passages to these ends respectively.

The invention will now be described by way of example with reference to the accompanying drawings in which:

FIGURE 1 is a diagrammatic representation of one form of valve constructed in accordance with the invention, FIGURE 2 is a fragmentary view illustrating an alternative flow control valve arrangement, and FIGURE 3 is a diagrammatic representation of an alternative form of valve.

With reference to FIGURE 1 there is provided a member 10 which has a piston like part disposed co-axially within a cylinder 11 in a body (not shown). Between the piston like part of the member 10 and the cylinder is a coaxial relatively slidable valve part in the form of a sleeve 12. The sleeve 12 has respective springs 13, 14 acting between its opposite ends and the ends of the cylinder 11 respectively, and the member 10 has extensions protruding through the closed end walls of the cylinder 11. The piston like part is in substantial sealing engagement with the interior of the sleeve 12.

In the mid-region of the cylinder 11 is an annular gallery 15 which can communicate with the interior of the cylinder 11 through openings 16 provided in the sleeve 12, there being sealing devices 17 acting between the sleeve 12 and the cylinder wall at opposite sides of these openings 16 respectively. The annular gallery 15 communicates through a passage 18 with a reservoir or other relatively low pressure part of an associated system, and opposite ends of the cylinder 11 communicate through restricted passages 19, 20 and past the valve closure member 21 with a source of fluid under pressure through a passage 22, the valve closure member 21 being under the control of an electrically operable solenoid or other signal pulse responsive device.

Fluid from the source also reaches cylinders 23 and 24 through passages 25 and 26 respectively, the cylinders 23, 24 being co-axial with the cylinder 11 and being disposed at opposite ends thereof respectively to receive the correspondingly reduced extensions of the member 10 respectively. The ends of the cylinders 23, 24 remote from the cylinder 11 communicate through restricted passages 27, 28 with the passage 18 to the reservoir or other low pressure part of the associated system.

The cylinder 24 has two aligned ports 29, 30 which in one position (illustrated) of the member 10, can communicate with one another through a groove in the member 10. In a second position of the member 10 indicated in dotted lines, communication between the passages 29 and 30 is cut off.

In the position illustrated, the valve closure member 21 is closing the passage 22. Fluid under pressure enters the cylinder 24 through the passage 26 and can escape slowly through the restricted passage 28. Since the passage 25 is blocked by the member 10, maintained in the cylinder 24, a higher pressure than that which obtains in the cylinder 23. Flow can also take place through the port 29 to the port 30.

Should it be required to cut off such flow, the valve 21 is opened by energisation of the solenoid or other device, and fluid enters both ends of the cylinder 11. Since fluid in the right hand end can escape through the openings 16 in the sleeve 12 and through the gallery 15 to the passage 18, the member 10 will be constrained to move to the right, thus cutting off supply of fluid from the port 29 to the port 30, and furthermore cutting off the supply of fluid under pressure through the passage 26 to the cylinder 24, and simultaneously opening communication for the passage 25 to the cylinder 23. The sleeve 12 will also be constrained to move to the right to cut off the flow of fluid through the openings 16, and into the gallery 15 until the member 10 has moved to a position at the opposite side of the openings 16 from that illustrated. The sleeve 12 will now revert to its former position under the action of its springs, pressures at opposite sides of the member and of the sleeve 12 being equalised upon closure of the valve 21 through the communicating passages 19 and 20. This position of the member 10 will be maintained until the valve 21 is again opened by actuation of the electrical solenoid or other device, and reliance is therefore not placed upon the ability to maintain the electrical solenoid or other device in an energised condition for the maintenance of communication or otherwise through the ports 29 and 30.

This valve is suitable, for example, for use in the selection of an emergency fuel system for a gas turbine engine.

It is to be understood that the arrangement of the ports 29, 30 can be replaced by an arrangement such as that illustrated in FIGURE 2 in which the port 29 and the passage 26 communicating with the high pressure source are combined, in a passage 31, whilst the port 30 is replaced by a passage 32. Between these two passages is a valve closure member 33 which is acted upon by the end of the member 10, and in the position illustrated, the valve closure member 33 permits communication between the passages 31 and 32. When the member 10 has been moved to the left, in FIGURE 2, the valve closure member 33 will also move under the influence of pressure reaching it through the passage 31, to permit flow from the passage 31 to the passage 32.

In the example illustrated in FIGURE 3 similar integers to those of FIGURE 1 are identified by the same numerals. The passages communicating with opposite ends of the cylinder 11 are however identified by numerals 34 and 35 respectively. These passages have respective valve closure members 36, 37 operated by respective electrical solenoids and the passages 34, 35 are connected to respective (or the same) sources of fluid under pressure. A restricted passage 38 affords communication between the passages 34 and 35.

In use, a signal pulse can be applied to either of the electrical solenoids to open the associated valve closure member 36 or 37. Initiation of the movement of the member 10 ensues as described with reference to the FIGURE 1 construction.

In a further alternative arrangement (not illustrated) the movement of the member 10 is used to control the direction of flow of fluid through the valve, or alternatively controls the ability for flow to take place therethrough. Both or either end of the member 10 can act to control flow in the manner described.

Having thus described my invention what I claim as new and desire to secure by Letters Patent is:

1. A valve comprising a body, a member disposed within the body and capable of occupying either of two positions in each of which it is maintained, when in use, by the application of fluid pressure on said member, passage means in the body through which flow of fluid is dependent upon the position of the member in the body, a part of the member being disposed within a cylinder in the body, passages in the body communicating with opposite ends of the cylinder respectively, said passages communicating with one another through flow restricting means, a valve part disposed within the cylinder in the body, said valve part being movable between a first position in which the escape of fluid from one end of the cylinder is permitted and a second position in which such escape is prevented, the member and said valve part being movable, under the influence of a signal pulse applied through one of said passages to the cylinder, towards that end of the cylinder from which fluid can escape, the member moving to a position in which a change occurs in the flow through said passage means and in which escape from the end of the cylinder remote from said one end is permitted, the valve part only permitting such escape when the pressures at opposite ends of the cylinder equalise through the passages to these ends respectively.

2. A valve as claimed in claim 1 in which said part of the member disposed within the cylinder is a piston like part and disposed between it and the cylinder is a coaxial sleeves which forms the valve part, the sleeve being slidable relatively to the cylinder and to the piston like part of the member.

3. A valve as claimed in claim 2 in which the sleeve is spring loaded towards a central position in the cylinder, in which escape of fluid from the cylinder is permitted, the end from which takes place being dependent upon the position of the member within the cylinder.

4. A valve as claimed in claim 1 in which the position of the member determines the end thereof at which fluid under pressure is applied for the purpose of maintaining the member in its selected position.

5. A valve as claimed in claim 4 in which the member controls flow through two passages capable of communicating with bores in which opposite ends of the member are slidably mounted respectively, said two passages being arranged to be placed in communication in use with a source of fluid under pressure, the position of the member determining the selection of the bore in which pressure is applied.

6. A valve as claimed in claim 1 in which the member acts as a spool to control flow through said passage means in the body.

7. A valve as claimed in claim 1 in which the member controls the movement of a closure member arranged in said passage means to control flow therethrough.

8. A valve as claimed in claim 1 in which the passages communicating with opposite ends of the cylinder respectively are both in communication with a passage having a valve closure member the valve closure member being opened in response to reception of a signal pulse, said passage being, in use, in communication with a source of fluid under pressure when said valve closure member is open, and the application of fluid under pressure through said passages to the cylinder initiating change of position of the member therein.

9. A valve as claimed in claim 8 in which the passages communicating with the ends of the cylinder have respective flow restricting means.

10. A valve as claimed in claim 8 in which the valve closure member is operable by an electrical solenoid.

11. A valve as claimed in claim 1 in which the passages communicating with opposite ends of the cylinder respectively have respective valve closure members, said valve closure members being opened in response to reception of respective signal pulses, said passages being, in use, subjected to fluid under pressure, when said valve closures are open, and the application of fluid under pressure through a selected one of said passages initiating change in the position of the member within the cylinder.

12. A valve as claimed in claim 11 in which the valve closure members are operable by respective electrical solenoids.

References Cited
UNITED STATES PATENTS 3,294,120   12/1966   Ruchser _____ 251—30 X ARNOLD ROSENTHAL, Primary Examiner U.S. Cl. X.R.
91—51; 251—31